(12) United States Patent
Smelko et al.

(10) Patent No.: US 7,217,454 B2
(45) Date of Patent: *May 15, 2007

(54) POLYMER LINED SEALING MEMBER FOR A CONTAINER

(75) Inventors: Joe Smelko, Aurora (CA); Marilyn Agnoluzzi, Keswick (CA)

(73) Assignee: Illinois Tool Works Inc., Glenview, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/026,991

(22) Filed: Dec. 30, 2004

(65) Prior Publication Data

US 2005/0123737 A1 Jun. 9, 2005

Related U.S. Application Data

(63) Continuation of application No. 09/568,328, filed on May 9, 2000, now Pat. No. 6,866,926.

(51) Int. Cl.
  *B32B 3/26* (2006.01)
(52) U.S. Cl. .................. 428/319.1; 428/343; 428/352; 428/346; 428/461; 428/462; 428/319.3; 251/232
(58) Field of Classification Search ............. 428/319.1, 428/343, 352, 346, 461, 462, 319.3
See application file for complete search history.

(56) References Cited

U.S. PATENT DOCUMENTS

| | | | |
|---|---|---|---|
| 4,531,649 A | 7/1985 | Shul | 215/232 |
| 4,744,481 A | 5/1988 | Morgan, Jr. | 215/329 |
| 4,767,655 A | 8/1988 | Tschudin-Mahrer | 428/57 |
| 4,815,618 A | 3/1989 | Gach | |
| 4,818,577 A | 4/1989 | Ou-Yang | 428/36.5 |
| 4,882,208 A | 11/1989 | Breitscheidel et al. | 428/17 |
| 4,930,646 A | 6/1990 | Emslander | 215/232 |
| 4,960,216 A | 10/1990 | Giles et al. | 215/232 |

(Continued)

FOREIGN PATENT DOCUMENTS

| | | |
|---|---|---|
| DE | 91 08 868 | 9/1991 |
| EP | 0 835 818 | 4/1998 |
| WO | 96 05055 | 2/1996 |

*Primary Examiner*—Hai Vo
(74) *Attorney, Agent, or Firm*—Day Pitney LLp

(57) ABSTRACT

A seal and method of manufacture is provided for sealing containers such as bottles, jars and the like. The seal (closure) can be formed with a lower sheetlike structure having a foam layer thereon. The lower structure can include foil and have a polymer layer, such as a PET layer thereunder A sealant layer can be provided under the bottom surface of the PET layer to bond the seal to a container opening. The polymer foam is advantageously polyethylene foam. Seals in accordance with preferred embodiments of the invention also include a top portion, which can be only partially bonded (directly or indirectly) to the bottom portion, so as to leave a tab portion extended therefrom. The top portion is advantageously bonded from periphery to periphery of the bottom portion and at or slightly offset from the diameter (middle) of the bottom portion. The top portion is advantageously formed with polymer material, such as an ethylene vinyl acetate (EVA) layer, having a layer of PET bonded on the top thereof. A release strip, which can have a release layer coated on the bottom thereof can be adhered to the top or bottom structures and used to prevent the tab from adhering to the lower structure.

11 Claims, 3 Drawing Sheets

U.S. PATENT DOCUMENTS

| | | | |
|---|---|---|---|
| 4,961,986 A | 10/1990 | Galda et al. | 428/201 |
| 5,004,111 A | 4/1991 | McCarthy | 215/232 |
| 5,316,835 A | 5/1994 | Groft et al. | 428/247 |
| 5,381,913 A | 1/1995 | Peeters | 215/232 |
| 5,702,015 A | 12/1997 | Giles et al. | 215/232 |
| 5,915,577 A | 6/1999 | Levine | |
| 6,001,471 A | 12/1999 | Bries et al. | 428/343 |
| 6,131,754 A | 10/2000 | Smelko | 215/232 |
| 2001/0023870 A1 | 9/2001 | Mithalov et al. | |

POLYMER LINED SEALING MEMBER FOR A CONTAINER

This application is a continuation of U.S. patent application Ser. No. 09/568,328, filed May 9, 2000, now U.S. Pat. No. 6,866,926 which is herein incorporated by reference.

BACKGROUND OF THE INVENTION

The invention relates generally to a sealing member for a container having an easy to grab tab on the top thereof for closing the mouth of a container.

It is often desirable to seal a bottle, jar or other container with a closure to maintain freshness of the contents thereof or to indicate whether the container has been tampered with. However, it is also desirable that the closure be easy to remove by the user. For example, U.S. Pat. No. 5,433,992, the contents of which are incorporated herein by reference, describes a top-tabbed closure for a container which has a membrane for sealing the container and a sheet which is bonded to the top of the membrane, in a manner which leaves a tab portion of the sheet free. A user seeking to gain access to the contents of the container simply grips the tab with their fingers and by pulling on the tab, which is connected to the sheet, can remove the entire closure and access the contents of the container in a relatively convenient manner.

Referring generally to FIG. 1, a conventional top-tabbed closure is shown generally at the top of a bottle 10 as container seal 100. A cross sectional view of seal 100, taken along line 2—2 of FIG. 1 which is not drawn to scale, is shown in FIG. 2.

Seal 100 includes a lower section 101, comprising a lower layer 110, which is formed of an adhesive, such as a hot melt adhesive or other sealants, for securing seal 100 to the top of bottle 10. Lower section 101 also includes a foil layer 120 and a PET layer 130 between foil layer 120 and sealant 110. Seal 100 also includes an upper section 102. Upper section 102 includes an ethylene vinyl acetate (EVA) layer 170 having a PET top layer 180 disposed thereon. A bottom surface 150 of EVA layer 170 is surface treated and bonded to foil layer 120. Lower surface 150 also bonds a paper release layer 140 to EVA layer 170. Thus, release layer 140 prevents EVA layer 170 from being completely bonded to foil layer 120 at lower surface 150. Lower surface 150 only bonds EVA layer 170 to foil 120 up to a boundary line 160 so as to permit a tab portion 200 to be graspable. However, this bond between upper section 102 and lower section 101 is strong enough, so that pulling tab portion 200 can remove all of seal 100 in one piece.

Conventional container seals can exhibit disadvantages. For example, a paper release or information layer can be sensitive to exposure to moisture. Use of PET release layers alone do not provide a fully satisfactory seal. Corrosion of foil layers can also present a problem. Also, conventional closures typically require containers to have smooth surfaces to insure proper bonding and release. Uneven heating during heat sealing steps has also occurred. Many closures will not separate from the container satisfactorily when the tab is pulled and tearing and unsatisfactorily incomplete removal has occurred.

Accordingly, it is desirable to provide an improved container seal which overcomes drawbacks and provides advantages compared to conventional container seals.

SUMMARY OF THE INVENTION

Generally speaking, in accordance with the invention, a seal and method of manufacture is provided for sealing containers such as bottles, jars and the like. The seal (closure) can be formed with a lower sheetlike structure having a foam layer thereon. The lower structure can include foil and have a polymer layer, such as a PET film thereunder. A sealant layer can be provided under the bottom surface of the PET layer to bond the seal to a container opening. Depending on the container being sealed, the PET film may be coated with a suitable material that will bond to various container types. The polymer foam is advantageously a polyolefin foam. Seals in accordance with preferred embodiments of the invention also include a top portion, which can be only partially bonded (directly or indirectly) to the bottom portion, so as to leave a tab portion extended therefrom. The top portion is advantageously bonded from periphery to periphery of the bottom portion and at or slightly offset from the diameter (middle) of the bottom portion. The top portion is advantageously formed with polymer material, such as an ethylene vinyl acetate (EVA) layer, having a layer of PET bonded on the top thereof. A release strip, which can have a release layer coated on the bottom thereof can be adhered to the top structures and used to prevent the tab from adhering to the lower structure. The release layer can be formed of PET or silicone release coated PET, paper, nylon or polypropylene.

To form seals in accordance with the invention, a first laminated sheet of bottom section material is laminated to a sheet of top section material after interposing tabbing strips therebetween. The tabbing strips can be bonded to the top section material and can be printed with written material or instructions. The bottom of the tabbing strips can be coated with a release promoting substance, so as to prevent the top sheet from bonding to the bottom sheet at the location of the tabbing strips. Seals, such as those in the shape of a disc, can then be die cut from the sheets. Each disc has approximately half of its area in plan view comprising a tabbing strip. The result is a seal with adhesive on a bottom side surface and a gripping tab on the top, bonded to half the seal. Such seals can be bonded to the top of containers to seal the contents thereof.

Accordingly, it is an object of the invention to provide an improved container seal.

Another object of the invention is to provide a container seal with increased strength and durability.

Another object of the invention is to provide a container seal which is more convenient to use.

Another object of the invention is to provide an improved method of making containers seals.

The invention accordingly comprises the several steps and the relation of one or more of such steps with respect to each of the others, and the article possessing the features, properties, and the relation of elements, which are exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Figure 1:
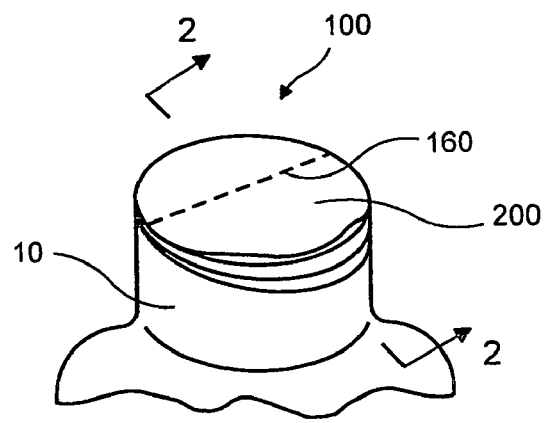
FIG. 1 is a perspective view of a conventional closure disposed over the mouth of a bottle.
Figure 2:
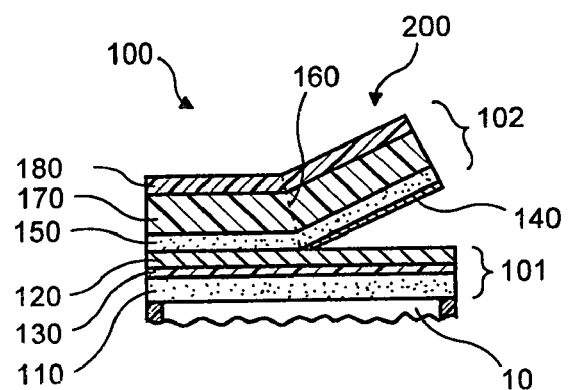
FIG. 2 is a cross sectional view of the closure of FIG. 1 taken along line 2—2.
Figure 3:
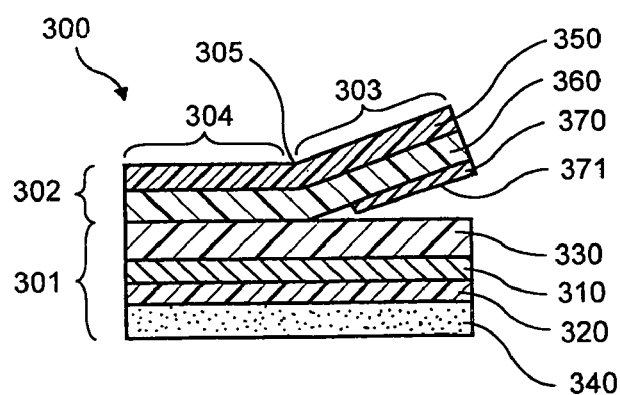
FIG. 3 is a side cross sectional view of a seal in accordance with a preferred embodiment of the invention.

A seal (closure) for a container constructed in accordance with a preferred embodiment of the invention is shown generally in FIG. 3 as seal 300. The relative thicknesses of the layers shown in FIG. 3 are not to scale, for purposes of illustration. Furthermore, the construction shown is provided for purposes of illustration only, and is not intended to be construed in a limiting sense.

Seal 300 is constructed from a bottom laminate sheet 301 and a top laminate sheet 302. Bottom sheet 301 includes a support layer 310 having a lower polymer layer 320 on the underside thereof and a polymer foam layer 330 on the top surface thereof. Support layer 310 is advantageously formed of a moisture proof material such as metal foil, preferably aluminum foil. Support layer 310 is advantageously about 0.0005 to 0.0020 inches thick.

Lower polymer layer 320 is advantageously formed of polyethylene terephthalate (PET), preferably to a thickness ranging from about 0.0004 to 0.0015 inches. Other suitable materials include nylon, PEN and polypropylene. The bottom surface of lower sheet 301 is advantageously coated with a sealant or adhesive 340, preferably a heat activated adhesive (sealant). The type of adhesive is based in part on the characteristics of the container. Suitable adhesives (as used herein, the term sealant will include adhesives suitable for adhering a container seal in accordance with invention, to a container) include polyester coatings, ethylene vinyl acetate, polypropylene, ethylene-acrylic acid copolymers, surlyn and other materials known in the industry.

The top surface of bottom sheet 301 (layer 330) is advantageously coated with a polymer foam 330, preferably a polyethylene foam. Other suitable polymer foams include polypropylene or propylene-ethylene copolymers. Polyethylene foam is preferred because of desired bonding behavior and bond strength. The thickness of foam layer 330 is advantageously at least 0.003 inches, more preferably at least 0.005 inches. If the thickness is too thin the heat from the induction sealing process can melt the foam. Also, the desired bond strength might not be achieved. Furthermore, if the foam is too thin, it will provide less compression and the container seals can become less reliable. When the foam is thicker than about 0.010 or even 0.008 inches, the benefits begin to stop and material's cost and bulkiness can present problems.

Top laminate sheet 302 is advantageously formed with a polymer support 350, advantageously including a polymer layer 360 on a bottom surface thereof. Support 350 is preferably formed from a strong heat resistant sheet-like material, which can maintain its strength at small thicknesses and which has high pull strength. A preferred material is PET and other suitable materials include PEN and nylon. Polymer layer 360 is advantageously formed of EVA foam and is advantageously from 0.001 to 0.003 inches thick. EVA is preferred because of its thermal bonding characteristics, such that it readily bonds to foam layer 330. If layer 330 is too thick, it becomes difficult to achieve satisfactory bonds. If it is too thin, bond strength can be inadequate. Other suitable materials include low density polyethylene, ethylene-acrylic acid copolymers and ethylene methacrylate copolymers.

Top sheet 302 also includes a tab portion 303. Tab portion 303 is not adhered to bottom sheet 301 and can be folded up and away from bottom sheet 301 to provide a gripping tab for removing seal 300 from the top of the container. Top sheet 302 also includes a joining portion 304 which is adhered to bottom sheet 301. A boundary 305 exists at the interface between tab portion 303 and joining portion 304. Boundary 305 advantageously extends in a straight line from edge to edge of seal 300. Boundary 305 is advantageously at or near the middle of seal 300.

The underside of tab 303 advantageously includes a release strip (tabbing strip) 370, preferably having a coat of release material 371 on the underside thereof. Release strip 370 and release coat 371 help prevent tab portions 303 from adhering to the top of bottom sheet 301. Release strip 370 is preferably formed of PET, such as white PET and advantageously includes written material, pictures other information thereon. Other suitable materials include nylon and polypropylene. Release layer 370 is advantageously 0.00045 to 0.0010 inches thick and preferably occupies the entire underside of tab portion 303, substantially up to boundary 305. Suitable materials for release coat 371 include various known heat resistant coatings preferably silicone release coatings.

Bottom sheet 301 can be formed by adhering polymer layer 320 to support layer 310 with adhesive. Polyethylene foam layer 330 can also be adhered to support layer 310 with adhesive. Suitable adhesives include ethylene acrylic acid copolymers, curable two part urethane adhesives and epoxy adhesives. A preferred adhesive is Morton Adcote 522 or Novacote 250. As used herein, the term adhesive will include curable adhesives, heat activated adhesives and thermoplastics. Top support layer 350 can also be adhered to polymer foam layer 360 with adhesive.

Figure 6:
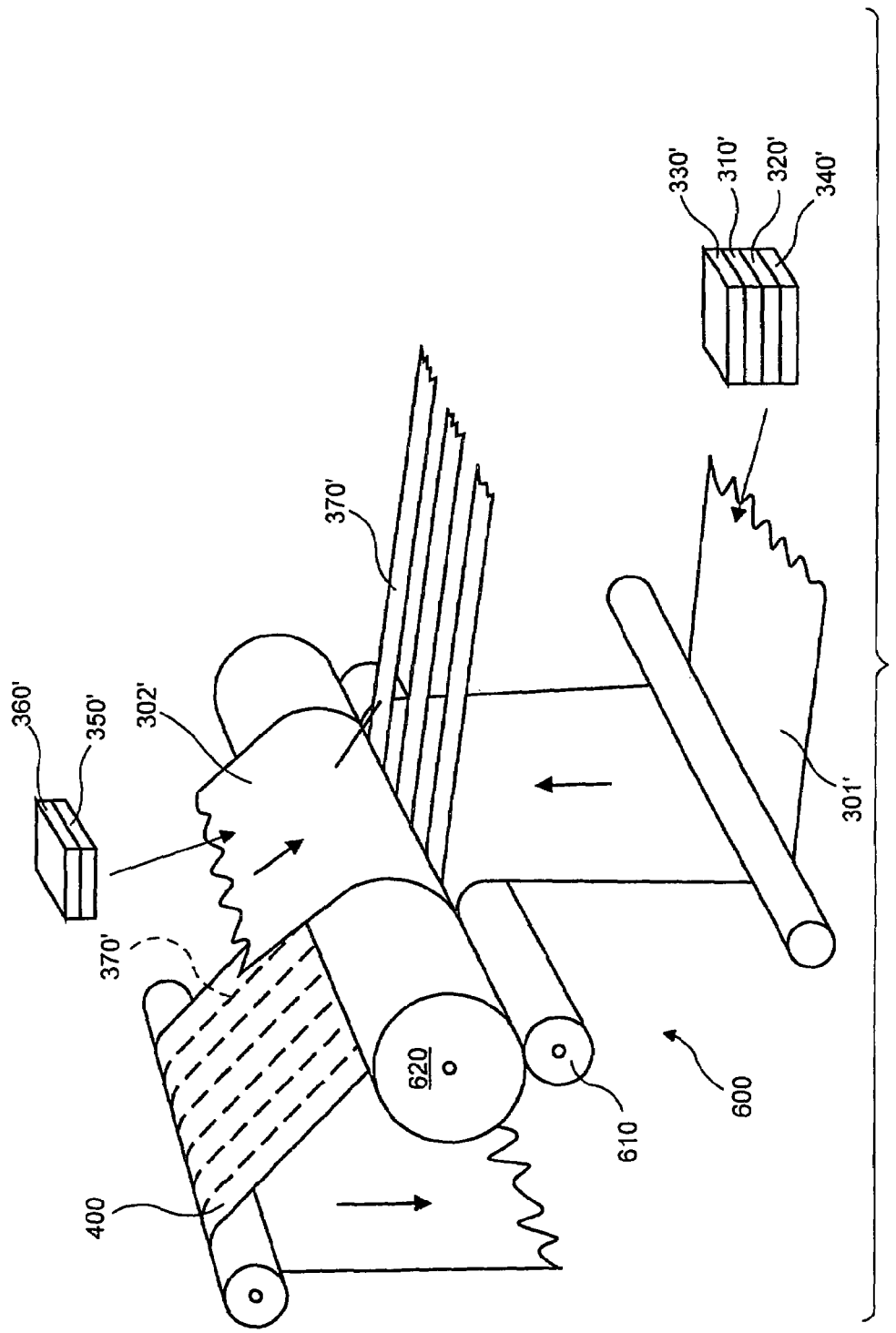
FIG. 6 is a demonstrative perspective view of an apparatus constructing sheets for forming container seals in accordance with a preferred embodiment of the invention.

An apparatus in accordance with a preferred embodiment of the invention for forming a laminated sheet from which seals in accordance with a preferred embodiment of the invention can be obtained is shown generally as apparatus 600 in FIG. 6.

A bottom sheet 301' including a support layer 310' with a top layer of polymer foam 330' and a bottom polymer coat 320', having sealant 340' on the bottom thereof is fed to the nip where a pressure roll 610 meets a hot roll 620. A top sheet 302' is also fed into the nip between pressure roll 610 and hot roll 620. Top sheet 302' includes a support film 350' and a polymer layer 360' on support film 350'. Top sheet 302' is fed into the nip between rolls 610 and 620 so that polymer layer 360' faces polymer foam layer 330'. Tabbing strips (release strips) 370' are combined with and inserted between top sheet 302' and bottom sheet 301' in a parallel spaced arrangement. After heat from hot roll 620 joins top sheet 302', tabbing strips 370' and bottom sheet 301', a laminate sheet 400 results.

Figure 4:
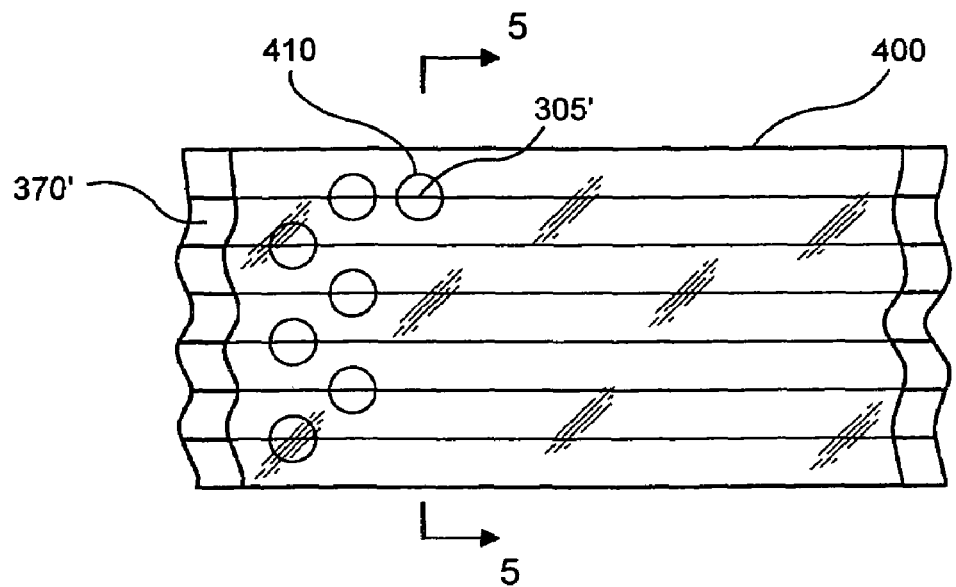
FIG. 4 is a top plan view of a sheet used to form seals in accordance with a preferred embodiment of the invention.
Figure 5:
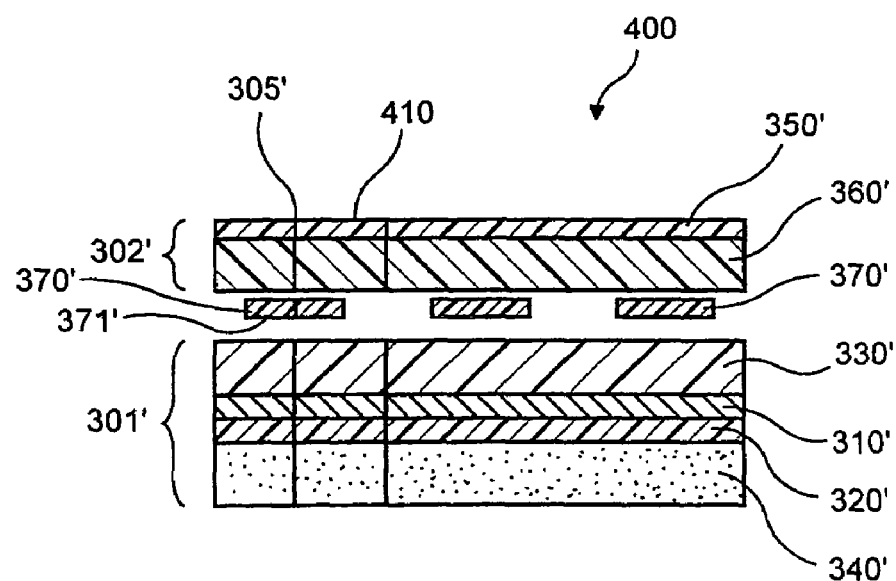
FIG. 5 is a cross sectional view of the sheet of FIG. 4 taken along line 5—5.

Laminate sheet 400 is shown in plan view in FIG. 4 and in cross section in FIG. 5. The relative size of the layers are not shown to scale and top sheet 302' bottom sheet 301' and tabbing strips 370' are not shown in a fully laminated joined structure. Also, adhesive between the layers has not been shown. However, those of ordinary skill in the art would understand how to adhere these multiple layers. To form seals in accordance with preferred embodiments of the invention, circular (or other appropriately shaped) portions 410 are die cut from sheet 400. As can be see in FIG. 4, a boundary 305' is established at the edge of each tabbing strip 370'. Because the bottom of tabbing strip 370' does not adhere to the top surface of foam layer 330', a tab portion will extend from foam layer 330' for gripping.

The following example is provided for purposes of illustration only and is not intended to be construed in a limiting sense.

A 0.7 mil aluminum foil sheet was adhered to a 0.5 mil PET film with adhesive. A 1.5 mil sealant film was then adhesive laminated to the PET surface of the foil/PET laminate. The three ply laminate was then adhered to a 4.5 mil thick PE foam layer with urethane adhesive to form a bottom sheet. The top sheet was adhered to the bottom sheet with a thermal bonding process after 0.5 mil PET tabbing strips were inserted therebetween. The bottom side of the tabbing strips was coated with a silicone release coating, to insure that they did not adhere to the polyethylene foam top layer of the bottom sheet. Circular seals, approximately 1.5 inches in diameter, were die cut from the strips, with the edge of the tabbing sheet extending approximately down the midpoint of the circle, to yield tabs having a base running down the middle of the seals, from edge to edge.

One advantageous method of attaching container seals in accordance with the invention to the tops of containers is with heat activated adhesive. The adhesive can be heated through induction heating, by utilizing a metal foil support in the bottom sheet of the seal, such as an aluminum foil support sheet. Tabs formed in accordance with the invention, in which the tabbing strip is formed of PET and the foam layer is included on the foil layer at the interface with the top layer, have been shown to result in substantially more even heating and improved sealing, compared to container seals in which the tabbing strip is formed of paper and without the foam layer.

Container seals in accordance with preferred embodiments of the invention were found to bond well to the top surface of a container, without the need to oversize the seal and have portions of the seal extend beyond the top edge of the container, providing a neater appearance. Container seals in accordance with the invention were also found to provide adequate sealing even when the top surface of the container was not substantially smooth, such as in the case of containers having mold lines or other imperfections on the top surface thereof. Container seals in accordance with the invention were also shown to exhibit substantially improved water resistance compared to container seals in which paper is exposed or in which a metal foil surface is either exposed or covered with only paper. Thus, container seals in accordance with the invention were shown to exhibit reduced corrosion from exposure to water or juices. The top foam layer was also found to provide heat insulation to isolate and prevent deterioration to the tab portion of the seal, when the sealant is heat activated to adhere the container seal to a container.

It will thus be seen that the objects set forth above, among those made apparent from the preceding description, are efficiently attained and, since certain changes may be made in carrying out the above method and in the articles set forth, without departing from the spirit and scope of the invention, is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall there between.

Particularly, it is to be understood that in said claims, ingredients or components recited in the singular are intended to include compatible mixtures of such ingredients wherever the sense permits.

What is claimed is:

1. A pull-tab sealing member, having a top side and a bottom side constructed to be secured to a lip around an opening of a container, to close the container, the pull-tab sealing member comprising:

a bottom member comprising a support layer having a bottom surface for facing a container, a top surface on the opposite side thereof and a polymer foam layer having a top surface, the polymer foam layer disposed over the top surface of the support layer, wherein the support layer comprises a metal foil, wherein the support layer includes a lower polymer layer disposed on the bottom surface of the support layer, and wherein the lower polymer layer includes a single sealant or adhesive coating for securing the bottom member to the container, the sealant or adhesive being heat-activated; and a top member comprising a top surface and bottom surface, and a portion of the top member comprising a tab portion having a top and a bottom surfaces, the bottom surface of the tab portion not secured to the top surface of the polymer foam layer of the bottom member, a portion of the bottom surface of the top member directly secured to the top surface of the polymer foam layer of the bottom member, wherein the top member is secured to the bottom member in a sufficiently strong manner, so that when the sealant or adhesive coating at the bottom surface of the bottom member is secured to a container, the bottom member is removed by pulling on the tab portion.

2. The seal of claim 1, wherein the polymer foam comprises polyethylene foam.

3. The seal of claim 2, wherein the polyethylene foam layer is at least about 3 mil thick.

4. The seal of claim 1, wherein a tabbing member is disposed at the bottom surface of the tab portion, positioned to face a portion of the surface of the bottom member and constructed to help prevent the tab portion from becoming affixed to the bottom member.

5. The seal of claim 4, wherein the tabbing member comprises PET.

6. The seal of claim 5, wherein the tabbing member has a layer of release material coated on the bottom surface thereof, the release material having less of a characteristic to adhere to the polymer foam layer than the PET layer.

7. The seal of claim 1, wherein the top member comprises a layer of EVA.

8. The seal of claim 1, wherein the top member comprises a layer of PET and a layer of EVA under the PET layer.

9. The seal of claim 1, wherein the polymer foam comprises polypropylene.

10. The seal of claim 1, wherein the polymer foam comprises propylene-ethylene copolymer.

11. A container sealed with a pull-tab sealing member secured to a lip around an opening of the container, the pull-tab member comprising:

a bottom member comprising a support layer having a bottom surface for facing the container, a top surface on the opposite side thereof and a polymer foam layer having a top surface, the polymer foam layer disposed over the top surface of the support layer, wherein the support layer comprises a metal foil, wherein the support layer includes a lower polymer layer disposed on the bottom surface of the support layer, and wherein the lower polymer layer includes a single sealant or adhesive coating for securing the bottom member to the container, the sealant or adhesive being heat-activated; and a top member comprising a top surface and bottom surface, and a portion of the top member comprising a tab portion having a top and a bottom surfaces, the bottom surface of the tab portion not secured to the top surface of the polymer foam layer of the bottom member, a portion of the bottom surface of the top member directly secured to the top surface of the polymer foam layer of the bottom member, wherein the top member is secured to the bottom member in a sufficiently strong manner, so that when the sealant or adhesive coating at the bottom surface of the bottom member is secured to a container, the bottom member is removed by pulling on the tab portion.

* * * * *